United States Patent
Schwender et al.

(10) Patent No.: US 10,239,002 B2
(45) Date of Patent: Mar. 26, 2019

(54) FILTER MATERIAL FOR FLUIDS AND METHOD FOR PRODUCING A FILTER MATERIAL

(75) Inventors: Matthias Schwender, Kirkel (DE); Andreas Schmitz, Kirkel (DE); Edwin Koch, Tholey (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 583 days.

(21) Appl. No.: 13/261,544

(22) PCT Filed: Jun. 22, 2011

(86) PCT No.: PCT/EP2011/003079
§ 371 (c)(1),
(2), (4) Date: Feb. 20, 2013

(87) PCT Pub. No.: WO2011/160829
PCT Pub. Date: Dec. 29, 2011

(65) Prior Publication Data
US 2013/0140228 A1    Jun. 6, 2013

(30) Foreign Application Priority Data
Jun. 23, 2010    (DE) .......................... 10 2010 025 219

(51) Int. Cl.
*B01D 39/14*    (2006.01)
*B05D 5/00*    (2006.01)
(Continued)

(52) U.S. Cl.
CPC ........... *B01D 39/14* (2013.01); *B01D 39/083* (2013.01); *B01D 39/1623* (2013.01); *B05D 5/00* (2013.01);
(Continued)

(58) Field of Classification Search
CPC ...... B01D 2239/0636; B01D 2239/065; B01D 2239/0654
See application file for complete search history.

(56) References Cited

U.S. PATENT DOCUMENTS 3,246,767 A * 4/1966 Pall ....................... B01D 29/111
210/505
4,411,948 A * 10/1983 Ogino .................... B01D 39/00
428/317.9
(Continued)

FOREIGN PATENT DOCUMENTS

DE    30 36 114 A1    5/1982
DE    42 06 738 A1    9/1993
(Continued)

OTHER PUBLICATIONS

NETAFILM, Mesh vs. Micron Comparison Chart.*
(Continued)

*Primary Examiner* — Bobby Ramdhanie
*Assistant Examiner* — Michael J An
(74) *Attorney, Agent, or Firm* — Wenderoth, Lind & Ponack, L.L.P.

(57) ABSTRACT

A filter material (2) for fluids, in particular hydraulic fluids, includes a filter medium (4) having at least one layer, and a supporting structure (6) partially made of a plastic material and resting flatly in some surface areas on at least one side of the filter medium (4). The filter medium (4) and the supporting structure (6) are connected to one another by laminating, covering and/or by a melting process.

17 Claims, 4 Drawing Sheets

(51) Int. Cl.
*B01D 39/08* (2006.01)
*B01D 39/16* (2006.01)
*D03D 1/00* (2006.01)
*D03D 15/00* (2006.01)
*B32B 37/00* (2006.01)

(52) U.S. Cl.
CPC ............... *B32B 37/00* (2013.01); *D03D 1/00* (2013.01); *D03D 15/0094* (2013.01); *B01D 2239/0478* (2013.01); *B01D 2239/0654* (2013.01); *B01D 2239/0668* (2013.01); *B01D 2239/0681* (2013.01); *D10B 2505/04* (2013.01); *Y10T 156/10* (2015.01)

(56) References Cited

U.S. PATENT DOCUMENTS

| | | | |
|---|---|---|---|
| 4,433,024 A | 2/1984 | Eian | |
| 4,582,747 A * | 4/1986 | Hirakawa et al. | 442/189 |
| 4,948,639 A | 8/1990 | Brooker et al. | |
| 5,306,534 A | 4/1994 | Bosses | |
| 5,539,072 A * | 7/1996 | Wu | B01D 39/1692 428/304.4 |
| 5,672,399 A * | 9/1997 | Kahlbaugh et al. | 428/36.1 |
| 5,992,560 A * | 11/1999 | Matsuoka et al. | 181/252 |
| 6,485,856 B1 * | 11/2002 | Brown | D04H 1/4209 429/142 |
| 7,354,876 B2 * | 4/2008 | Porter et al. | 442/172 |
| 7,691,168 B2 | 4/2010 | Fox et al. | |
| 2006/0135699 A1 * | 6/2006 | Li | C08L 23/10 525/240 |
| 2006/0243134 A1 * | 11/2006 | von Blucher et al. | 95/90 |
| 2007/0207186 A1 * | 9/2007 | Scanlon et al. | 424/424 |
| 2008/0023385 A1 * | 1/2008 | Baker, Jr. | B01D 39/1623 210/195.1 |
| 2009/0078637 A1 * | 3/2009 | Shane | B01D 39/1623 210/243 |
| 2009/0249951 A1 * | 10/2009 | Graber | B01D 39/1623 95/69 |
| 2010/0224554 A1 * | 9/2010 | Schindelin | B01D 46/0036 210/493.5 |
| 2011/0005990 A1 * | 1/2011 | Schmitz | B01D 39/2017 210/243 |

FOREIGN PATENT DOCUMENTS

| | | |
|---|---|---|
| DE | 101 44 867 A1 | 3/2003 |
| DE | 10144867 * | 3/2003 |
| DE | 10 2004 054 245 A1 | 5/2006 |
| DE | 10 2008 005 794 A1 | 7/2009 |
| DE | 102008029443 A1 * | 1/2010 |
| EP | 0 084 143 A1 | 7/1983 |
| EP | 0 324 601 A2 | 7/1989 |
| EP | 1 436 062 B1 | 9/2005 |
| GB | 2 077 312 A | 12/1981 |

OTHER PUBLICATIONS

Machine Translation of DE 10144867, EPO Machine Translation, pp. 1-6.*

Machine Translation of DE 102008029443 A1, Wipo Machine Translation, pp. 1-2.*

* cited by examiner

FILTER MATERIAL FOR FLUIDS AND METHOD FOR PRODUCING A FILTER MATERIAL

FIELD OF THE INVENTION

The invention relates to a filter material for fluids, in particular for hydraulic fluids, comprising a filter medium having at least one layer and a support structure formed at least partially from a plastic material and adjoining at least one side of the filter medium in surface regions, and to method for producing such a filter material.

BACKGROUND OF THE INVENTION

Filter materials for producing interchangeable filter elements in hydraulic systems are known in diverse configurations and include, for example, of a filter nonwoven, preferably of several layers, with a support structure on one or both sides (incident flow side or outflow side). A hydraulic fluid to be filtered flows through these types of filter elements, in part with a considerable pressure difference arising from the unfiltered side to the filtered side. To be able to withstand this pressure difference and dynamic flow forces in the unfiltered material, the filter materials from which corresponding filter elements are produced have support structures. Such support structures are subject to strong cyclic pressure loading in the operation of a filter element and are generally formed from metal fabrics, especially fabrics made of high-grade steel wires.

EP 1 436 062 B1 discloses a filter element for fluids, in particular hydraulic fluids, comprising a filter material of the aforementioned type. The filter material comprises a filter medium with a latticed support structure supporting the filter medium with respect to the flow direction through the filter element at least on the filtered side. The support structure is produced from a plastic material, has electrically conductive elements, is made as a support fabric of metal filaments and plastic threads and rests flat on the filter medium. The filter medium and the flat-resting support fabric or the support structure are folded up into a star shape.

Another generic filter material for fluids and a method are disclosed in DE 200 13 839 U1. The known filter material is a textile composite partially of an electrically conductive material and contains at least one support layer formed by threads arranged crosswise to one another and at least one fiber support formed by a pinned non-woven fabric. The support layer or the support structure is made as a woven fabric or a non-crimp fabric, with some of the threads of the woven fabric being formed from an electrically conductive material, preferably metal. The other threads are formed from a plastic material in the same manner as the non-woven fabric forming the filter medium. To carry out the needling process, the puncture depth is advantageously chosen such that the needles completely pierce the non-woven fabric. The puncture density is typically 800 punctures per $cm^2$. The joining of the two layers by needling is complex and consequently costly.

SUMMARY OF THE INVENTION

An object of the invention is to provide an improved filter material that can be produced or supplied easily and economically without limiting its functionality and stability.

This object is basically achieved according to the invention by a filter material for fluids and a method for producing a filter material for fluids.

Because the filter medium and the support structure are joined or are being joined to one another by lamination, coating, and/or a melting method, a connection between the at least one layer of the filter medium and the support structure is easily formed. Both the strength of the support structure and a good permanent connection between the filter medium and support structure are ensured. The improved and stiffer support leads to an improved differential pressure behavior of the filter material in a filter element and to an improved collapse stability. The individual layers of the filter material according to the invention that are joined flat to one another have much greater stability of shape than conventional materials, as a result of which distortion in one spatial direction is largely prevented.

Another advantage is the thin execution of the filter material that has been produced by lamination, coating, and/or melting. In particular, the filter material is thinner than the individual layers so that by forming additional folds a greater filter area can be formed in a filter element, and consequently, the available installation space is better used for filtration. The improved drainage function of the filter material layers that have been joined to one another according to the invention leads to a lower differential pressure and consequently to an improved operating behavior of a filter element equipped with the filter material according to the invention.

In an advantageous configuration of the filter material according to the invention, adhesive spots, applied at least in individual areas in a spray application adhere to the filter medium, especially are provided in different sizes and/or in an irregular arrangement. Especially preferably, the adhesive spots and/or an additional coating provided on the filter medium can partially enclose at least some of the passage openings for fluid that are dictated by the support structure. In this way, the fluid permeability of the filter medium is not adversely affected, and consequently its filtration capacity is essentially preserved in spite of the applied support structure. A filter material configured in this way is used in particular for fine filter elements. The spray application of the adhesive on the one hand yields an adhesive bond that is uniformly strong over the area of the filter medium between the support structure and the filter medium, as well as an additional stiffening of the filter medium with minimum possible adverse effect on the fluid permeability of the passage openings covered by the filter medium.

In a preferred configuration of the filter material according to the invention, the material of the support structure comprises polybutylene terephthalate (PBT) plastic, polypropylene (PP) plastic, and/or polyethylene (PE) plastic. These plastics are characterized by an average strength, a high stiffness, and hardness. Partially crystalline polyethylene terephthalates (PET) have thermal boundaries of use of from −20° C. to about +100° C., briefly up to +200° C. They are resistant to dilute acids, aliphatic and aromatic hydrocarbons, oils, fats, esters, and alcohols. Compared to polyethylene terephthalate, polybutylene terephthalate has a somewhat lower strength; its boundaries of use are about −40° C. to +250° C. Isotactic polypropylene can be used up to about 150° C. and is chemically very stable.

In another preferred configuration of the filter material according to the invention, the support structure is made as a lattice or a woven fabric. A latticed or grid-shaped arrangement of thread elements yields a uniform stability of shape and filtration characteristics that are homogeneous over the area of the filter material.

Preferably, the thickness of the thread elements that form the lattice or woven fabric varies over the area of the filter material, especially when the thread elements in the weft direction have a thickness that is different from that of the thread elements in the warp direction. Execution as a lattice or woven fabric yields good strength properties and good fluid permeability. By using thread elements of different thicknesses, the passage area through which the fluid can flow is further enlarged.

The thickness of the thread elements in the weft direction is preferably 250 µm and in the warp direction preferably 200 µm. Advantageously, the mesh size of the lattice or of the woven fabric is 850 µm×1200 µm. With this dimensioning, the supporting lattice or support fabric formed by the thread elements has good strength properties and a maximum possible fluid passage area, in other words, high fluid permeability. Depending on the mesh size, the support structure effects coarse filtration for particles whose dimensions exceed the mesh size.

Moreover, at least one electrically conductive line element can be worked into the support structure, with the at least one electrically conductive line element preferably being made metal-free and/or containing carbon. Especially preferably, the electrically conductive line element is made as a bicomponent fiber with a carbon-coated plastic fiber.

The filter medium that effects the actual filtration is made as a nonwoven, preferably as a plastic nonwoven, especially preferably as a polyester nonwoven.

The material of the filter medium comprises preferably polybutylene terephthalate (PBT) plastic, polypropylene (PP) plastic, and/or polyethylene (PE) plastic. The laminated nonwoven can be made conductive to improve the electrostatic properties of the filter material.

Advantageously the filter medium and the support structure are joined to one another like a blanket. This joining prevents the filter medium and support structure from lying apart from one another, which is undesirable and adversely affects the supporting and filtration action, and avoids spacing between the filter medium and support structure in surface areas that are not joined to one another when the filter material is used properly, for example, in pleat-shaped folding-up.

In one preferred version of the method according to the invention, the support structure is laminated onto the filter medium as a coating. This creates a permanently strong connection of the filter material layers, allowing higher strength with a lower material thickness of the support structure. The filter material formed in this way with a support structure applied on one or both sides to a filter medium, especially a filter nonwoven, can be further processed into filter elements having very good stability of shape even under changing pressure loads. The filter medium and the support structures can be produced first as separate material layers and then joined to one another. The support structure can, however, also be made in one pass and joined to the filter medium. The pressure for fixing the support structure on the filter medium can be applied, for example, via a roller.

The support structure can be applied to the filter medium in an immersion method. Here, for example, a mask is placed on the filter medium. The filter medium is then immersed in a bath with plastic-containing material for the support structure. The open spaces of the mask corresponding to the support structure to be formed are filled with plastic material that cures and compacts after immersion in this way, the plastic material forms the support structure in direct connection to the filter medium. To cure and compact the support structure, heating or cooling can additionally be carried out. Excess material can be removed with a doctor blade.

Furthermore, the support structure can be applied to the filter medium in a doctoring method. With the doctoring method, the elements that form the support structure, such as the thread elements of a lattice or a woven fabric, are applied to the filter medium in a preferably uniform pattern. Alternatively, the prefabricated support structure, especially partially compacted and cured, can be placed flat on the filter medium by a carrier roller and can be joined to the filter medium.

In another preferred version of the method according to the invention, the support structure is calender-coated onto the filter medium in a cementing process. In doing so, depending on the requirements imposed on the filter material, support structures of the most varied form and execution can be applied to a filter medium. In particular, the execution and application of the support structure can be done in one process step; i.e., a plastic material which has adhesive properties is applied to the filter medium corresponding to the desired support structure and then cures. Depending on the requirements, support structures with certain supporting and filtration properties can be formed by the type and the alignment of the plastic threads or fibers and by the choice of the plastic material.

Further advantageously, an adhesive can be applied to the filter medium in a carrier application. In doing so, the adhesive is not applied directly, for example, by a nozzle, to the filter medium, but first to a carrier, such as a carrier roller, and then to the filter medium. This yields the advantage that the carrier structure is formed first on a carrier, partially cured, and can be checked for faults before it is cemented or calender-coated onto the filter medium.

Advantageously, the adhesive is applied to the filter medium in a spray application. As the adhesive is being sprayed on, droplet-like adhesive spots are formed on the filter medium. The adhesive spots create an adhesive bond between the filter medium and the support structure upon contact with the support structure. The adhesive spots or adhesive droplets that are not used for cementing and that are located in passage regions of the support structure lead to a reinforcement of the nonwoven-like filter medium, with the fluid passage and the three-dimensional deformability of the filter medium being almost unaffected. Alternatively or in addition to the adhesive spots of adhesive, an additional coating can be applied to the filter medium, with the adhesive spots and/or the coating advantageously being applied to the filter medium such that at least some of the passage openings for fluid that are dictated by the support structure are at least partially enclosed or covered.

Further advantageously, an adhesive layer can be applied to the filter medium and/or the support structure. In doing so, the entire contact surface between the support structure and the filter medium is used as a joining or adhesive surface. As a result, a good connection between the two material layers is ensured. This connection is especially important when the support structure has thin thread elements compared to the passage regions.

Advantageously, a self-adherent adhesive, especially a hot-melt adhesive, that joins the filter medium to the support structure, is used. In doing so, additional heating of the adhesive to form an adhesive bond can be omitted so that the method according to the invention can be easily carried out.

In another preferred version of the method according to the invention, the support structure is applied to the filter medium in a thermal melting method, especially in an ultrasonic method. In ultrasonic bonding, mechanical vibrations are transferred to the plastic parts under pressure. Molecular friction and interface friction generate heat that allows the damping coefficient of the material to increase and allows the plastic to soften locally. This reaction accelerates by itself, since a greater proportion of the vibration energy is converted into heat due to the increase in the damping factor of the plasticized material. After completion of sonic irradiation, a short cooling phase under the still prevailing joining pressure is necessary to uniformly compact the previously plasticized material. Afterwards, the material layers that have now been joined using ultrasonic energy can be further processed. The rapid and controlled melting of the materials is achieved by suitable bonding geometries, such as tips, edges, or rotations in the joining zones or on sonotrons or an anvil. The parts are thermally loaded only to a minor degree due to the low energy required for ultrasonic bonding. The basic properties of the materials to be bonded are not altered by the use of ultrasound. A high process speed and the simultaneous execution of working steps such as ultrasonic bonding, cutting, and/or rolling-up or folding-up enable effective production processes.

Furthermore, the support structure can be applied to the filter medium in a chemical melting method. Moreover, physical melting methods, especially adhesion methods, are conceivable for joining the support structure and the filter medium. Polyvinyl silicones are especially preferably used to form the plastic lattice and the support structure.

The aforementioned features and those presented below can be implemented according to the invention individually or in any combination.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure and are schematic and not to scale.

DETAILED DESCRIPTION OF THE INVENTION

Figure 1:
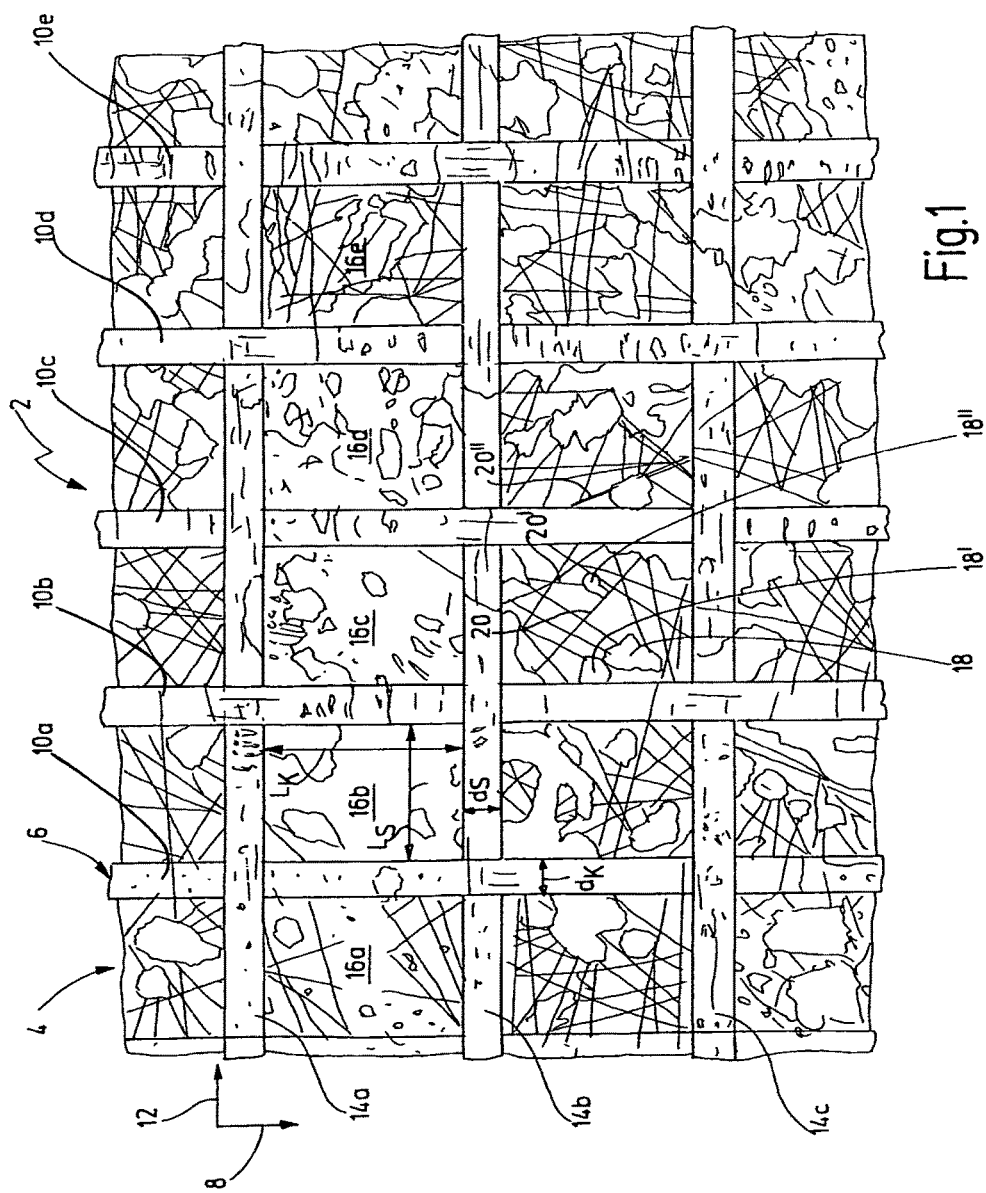
FIGS. 1 to 4 are each an enlarged plan view of one surface section of a filter material according to first, second, third, and fourth exemplary embodiments of the invention, respectively.

FIG. 1 shows a rectangular section of a filter material 2 that has a flat shape and several layers of a filter medium 4 and a support structure 6. The filter medium 4 is produced from a plastic nonwoven in one layer. The support structure 6 comprises thread elements 10a, 10b, 10c, 10d, 10e extending in a warp direction 8 and other thread elements 14a, 14b, 14c extending in a weft direction 12. The thread elements 10a, 10b, . . . , 14a, 14b, . . . form a regular woven fabric, in the manner of a plain weave, with the thread elements 10a, 10b, . . . , 14a, 14b, . . . each being woven in alternation at crossing sites over and then under the next thread element 10a, 10b, . . . , 14a, 14b, . . . . The thread elements 10a, 10b, . . . , 14a, 14b, . . . have essentially the same thickness $d_S$, $d_K$, The values for $d_K$ are, for example, 246 µm and 262.4 µm; the values for $d_S$ are, for example, 252.6 µm and 242.8 µm. Moreover, the thread elements 10a, 10b, . . . , and 14a, 14b, . . . extending in groups parallel to one another are arranged equidistant to one another, yielding a uniform mesh size of the passage openings 16a, 16b, 16c, 16d, 16e, . . . arranged between the thread elements 10a, 10b, . . . , 14a, 14b, . . . . The mesh size of the woven fabric forming the support structure 6 is designated $L_S \times L_K$ and is, for example, 869.3 µm×1243.3 µm for the passage opening 16b; 862.8 µm×1217.1 µm for the passage opening 16c; and 908.7 µm×1233.5 µm for the passage opening 16d.

The material of the support structure 6 is PBT plastic that has been applied to the filter medium 4 made as a polyester nonwoven in a coating process. Here, adhesive has been applied or sprayed onto the filter medium 4 first in a spray application so that droplet-shaped adhesive spots 18, 18', 18", . . . of different sizes form and adhere to the filter medium 4 in an irregular arrangement. Then, the support structure 6 that has been made first as a separate material layer is placed or pressed onto the filter medium 4. As a result of this placement on the adhesive spots 18, 18', 18", . . . lying between the thread elements 10a, 10b, . . . , 14a, 14b, . . . and the nonwoven threads 20, 20', 20" . . . of the filter medium 4, an adhesive bond is formed, and the multilayer filter material 2 is completed. The spray application of the adhesive yields an adhesive bond that is uniformly strong over the area of the filter medium 4 between the support structure 6 and the filter medium 4. Additional stiffening of the filter medium 4 is produced from polyester nonwoven with the minimum possible adverse effect on the fluid permeability of the passage openings 16a, 16b, . . . occupied by the filter medium 4.

Figure 2:
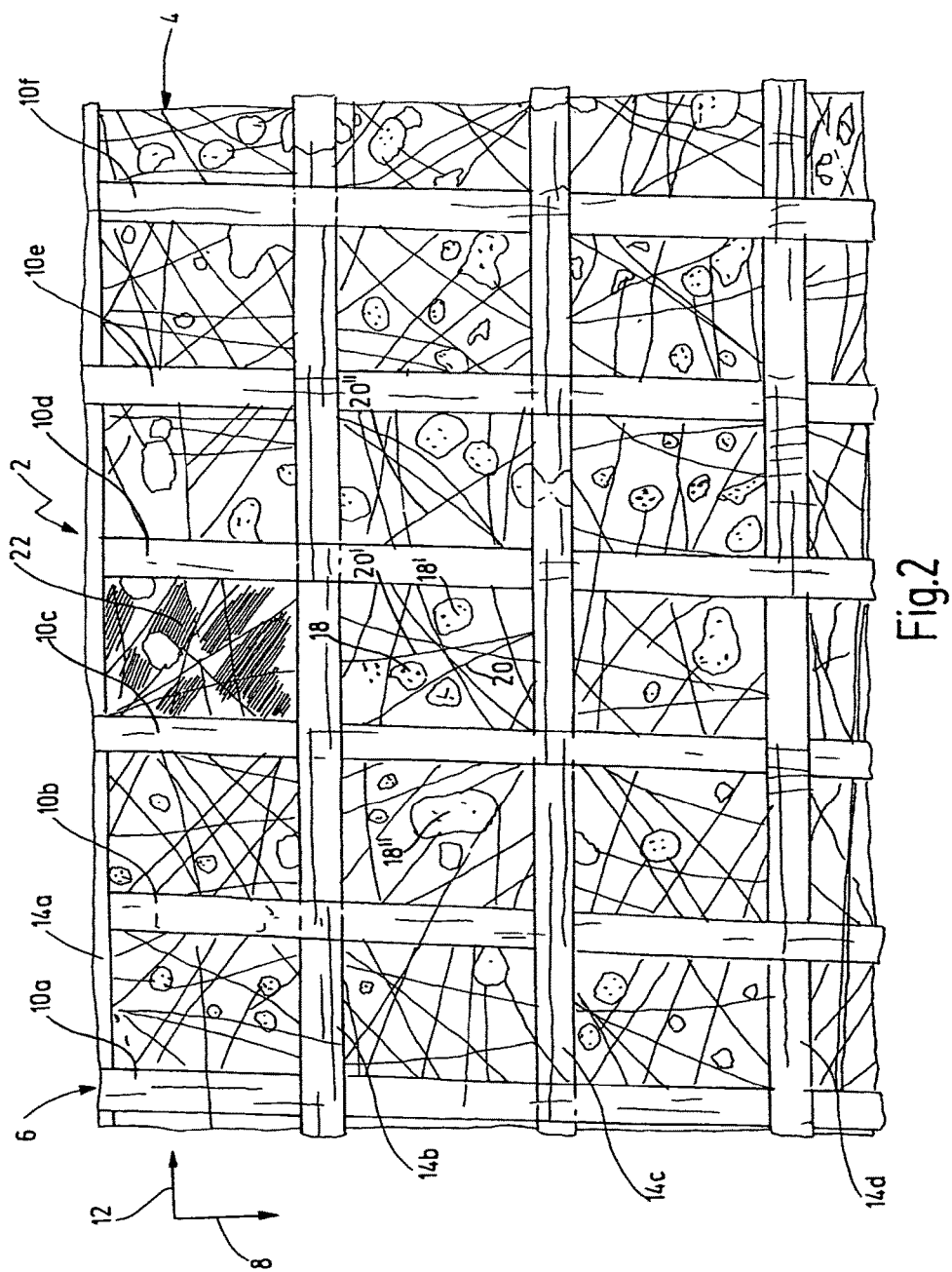

The filter material 2 shown in FIG. 2 differs from the one shown in FIG. 1 in that the filter medium 4 has an additional coating 22 by which the nonwoven threads 20, 20', 20" of the filter medium 4, or more precisely their intermediate spaces, are for the most part closed. The coating 22 is shown by way of example in a passage region between the thread elements 10c, 10d, 14a, 14b, but extends over the entire filter medium 4. In this way, the fluid permeability of the filter medium 4 is reduced, and consequently its filtration capacity is improved. The adhesive spots 18, 18', 18", . . . that have been applied in a spray application can likewise be easily recognized. The filter material 2 shown in FIG. 2 is used especially for fine filter elements. The thread elements 10a, 10b, . . . , 14a, 14b, . . . of the fabric-like support structure 6 extend in groups parallel to one another and cross at right angles. Parallelogram-shaped, especially diamond-shaped configurations of the fabric-like support structure 6 are, however, also conceivable.

Figure 3:
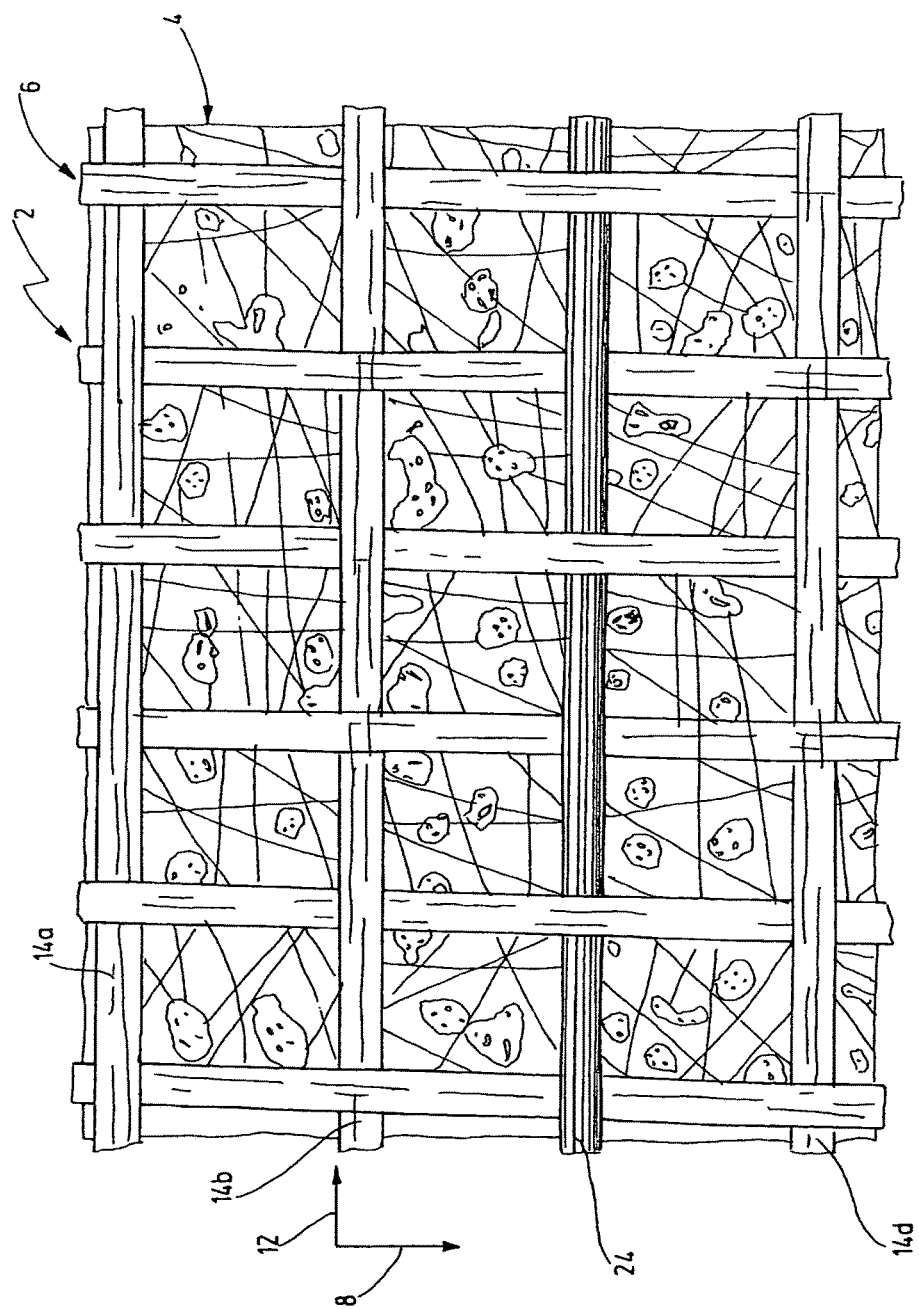

FIG. 3 shows one exemplary embodiment with an electrically conductive thread 24 made as a carbon filament and woven into the fabric-like support structure 6. The electrically conductive threads 24 improve the electrostatic properties of the filter material 2 and reinforce it mechanically. The woven-in conductive thread 24 can extend in the weft direction 12, as shown in FIG. 3, but an arrangement in the warp direction 8 is also conceivable. As shown in FIG. 3, it can replace a regular thread element 14c, but can also in addition be worked in. In particular, other electrically conductive threads (not shown) can be worked into the support structure 6.

Figure 4:
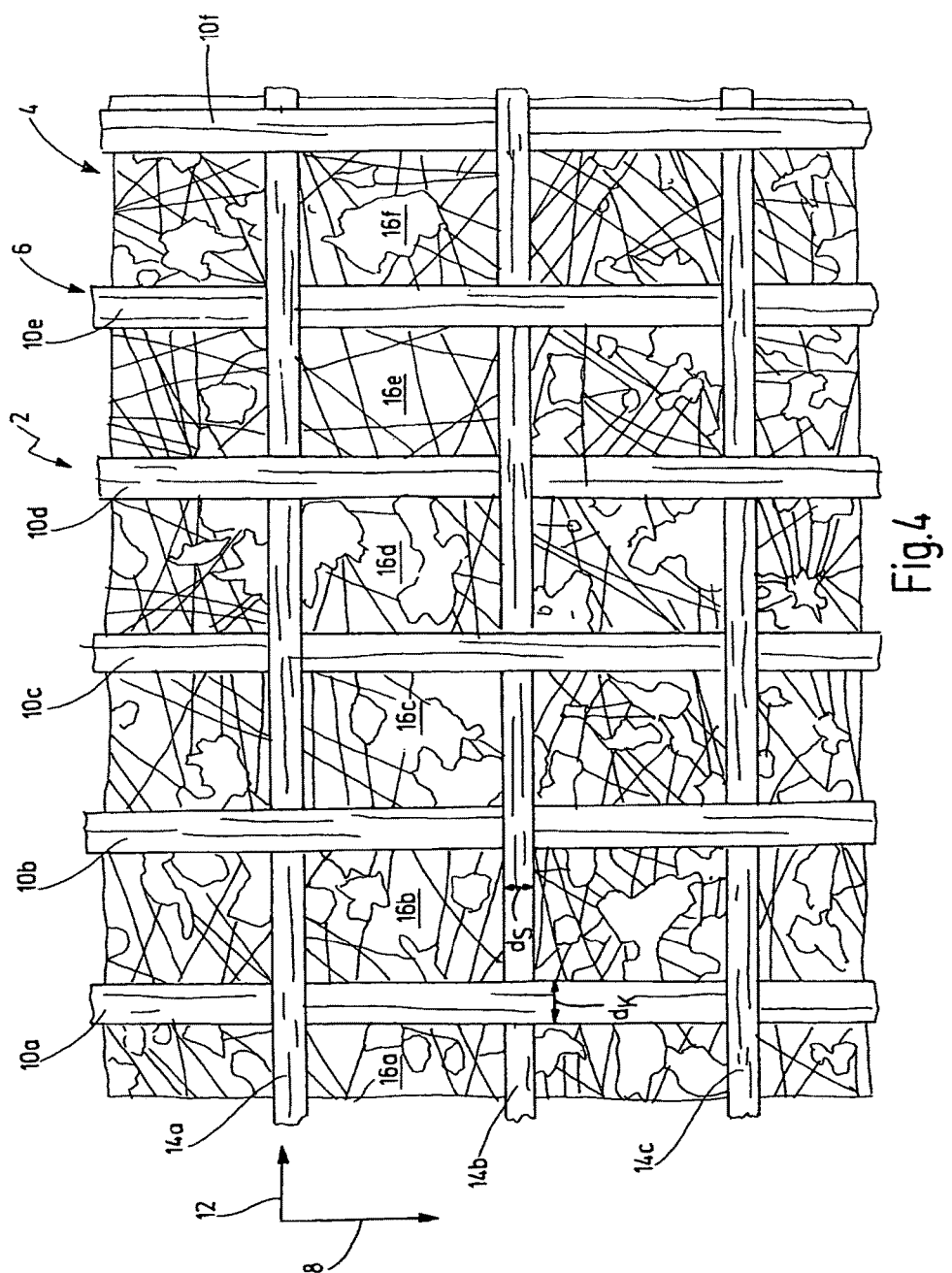

While in the exemplary embodiments shown in FIGS. 1 to 3 the thickness of each thread elements 10a, 10b, . . . , 14a, 14b, . . . is essentially the same and is about 250 µm, FIG. 4 shows a filter material 2 with thread elements 10a, 10b, . . . , 14a, 14b, . . . of different thicknesses. The thread elements 10a, 10b, . . . extending in the warp direction 8 have a thickness $d_K$ of about 250 µm, such as 262.4 µm, 252.6 µm, and 259.2 µm. The other thread elements 14a, 14, . . . extending in the weft direction 12 have a diameter and a thickness $d_S$ of about 200 µm, such as 193.6 µm and 200.1 µm. This yields larger passage openings 16a, 16b, . . . and consequently improved fluid permeability of the support structure 6 and of the entire filter material 2.

While various embodiments have been chosen to illustrate the invention, it will be understood by those skilled in the art that various changes and modifications can be made therein without departing from the scope of the invention as defined in the appended claims.

The invention claimed is:

1. A hydraulic fluid filter material, comprising:
   a filter medium made of a polyester nonwoven and configured for and capable of filtering hydraulic oil, said filter medium having at least one layer; and
   a support structure made of a polybutylene terephthalate plastic material and adjoining at least one side of said filter medium in surface regions of said filter medium, said filter medium being joined to said support structure by coating; and
   an additional coating on said filter medium partially covering at least some of passage openings defined by said support structure, said additional coating being a spray application of adhesive spots of different sizes and in an irregular arrangement on said filter medium.

2. A hydraulic fluid filter material according to claim 1 wherein
   said adhesive spots are applied in individual areas of said filter medium.

3. A hydraulic fluid filter material according to claim 1 wherein
   said support structure comprises at least one of a lattice or a woven fabric.

4. A hydraulic fluid filter material according to claim 3 wherein
   said at least one lattice or woven fabric comprises thread elements having thread thicknesses varying over an area of said filter medium, said thread elements in a weft direction having thicknesses different from said thread element in a warp direction.

5. A hydraulic fluid filter material according to claim 4 wherein
   said thread elements in the weft direction have a thickness of about 250 µm; and
   said thread elements in the warp direction have a thickness of about 200 µm.

6. A hydraulic fluid filter material according to claim 3 wherein
   said at least one of said lattice or woven fabric has a mesh size of 850 µm by 1200 µm.

7. A hydraulic fluid filter material according to claim 1 wherein
   said filter medium and said support structure are joined to form a blanket structure.

8. A hydraulic filter material according to claim 1 wherein said filter medium is electrically conductive.

9. A hydraulic filter material according to claim 1 wherein
   said support structure is a woven fabric having openings with dimensions of 869.3 µm by 1243 µm, of 862.8 µm by 1217.1 µm and of 908.7 µm by 1233.5 µm.

10. A hydraulic filter material according to claim 4 wherein
    said thread elements in the weft direction have thicknesses of 252.6 µm and 242.6 µm; and
    said thread elements in the warp direction have thicknesses of 246 µm and 262.4 µm.

11. A hydraulic filter material according to claim 1 wherein said support structure comprises a fabric having threads forming parallelograms.

12. A hydraulic filter material according to claim 1 wherein
    said support structure comprises a fabric having an electrically conductive, carbon fiber woven therein.

13. A hydraulic filter material according to claim 12 wherein
    said electrically conductive, carbon fiber is at least one of a warp thread or a weft thread of said support structure.

14. A hydraulic filter material according to claim 1 wherein
    said thread elements in the warp directions have thicknesses of 262.4 µm, 252.6 µm and 259.2 µm; and
    said thread element in the weft direction have thicknesses of 193.6 µm and 200.1 µm.

15. A method for producing a hydraulic fluid filter material, comprising the steps of:
    forming a filter medium made of a polyester nonwoven and configured for and capable of filtering hydraulic oil, said filter medium having at least one layer and at least one side,
    joining flat a support structure made of a polybutylene terephthalate plastic in regions of the one side of the filter medium by coating, and
    applying adhesive spots of different sizes and in an irregular arrangement on the filter medium partially covering at least some of fluid passage openings dictated by the support structure by a spray application.

16. A method according to claim 15 wherein
    the adhesive spots self-adherently joins the filter medium to the support structure.

17. A hydraulic filter material, comprising:
    a filter medium configured for and capable of filtering hydraulic oil, said filter medium having at least one layer, said filter medium including nonwoven polyester threads with intermediate spaces and having a coating closing most of said intermediate spaces, said coating being a spray application of adhesive spots of different sizes and in an irregular arrangement on said filter medium; and
    a support structure made of a polybutylene terephthalate plastic and adjoining at least one side of said filter medium in surface regions of said filter medium, said filter medium being joined to said support structure by said coating.

* * * * *